Dec. 12, 1939.  R. M. SLOUGH  2,183,338
LIQUID SAMPLING APPARATUS
Filed Jan. 19, 1939  3 Sheets-Sheet 1
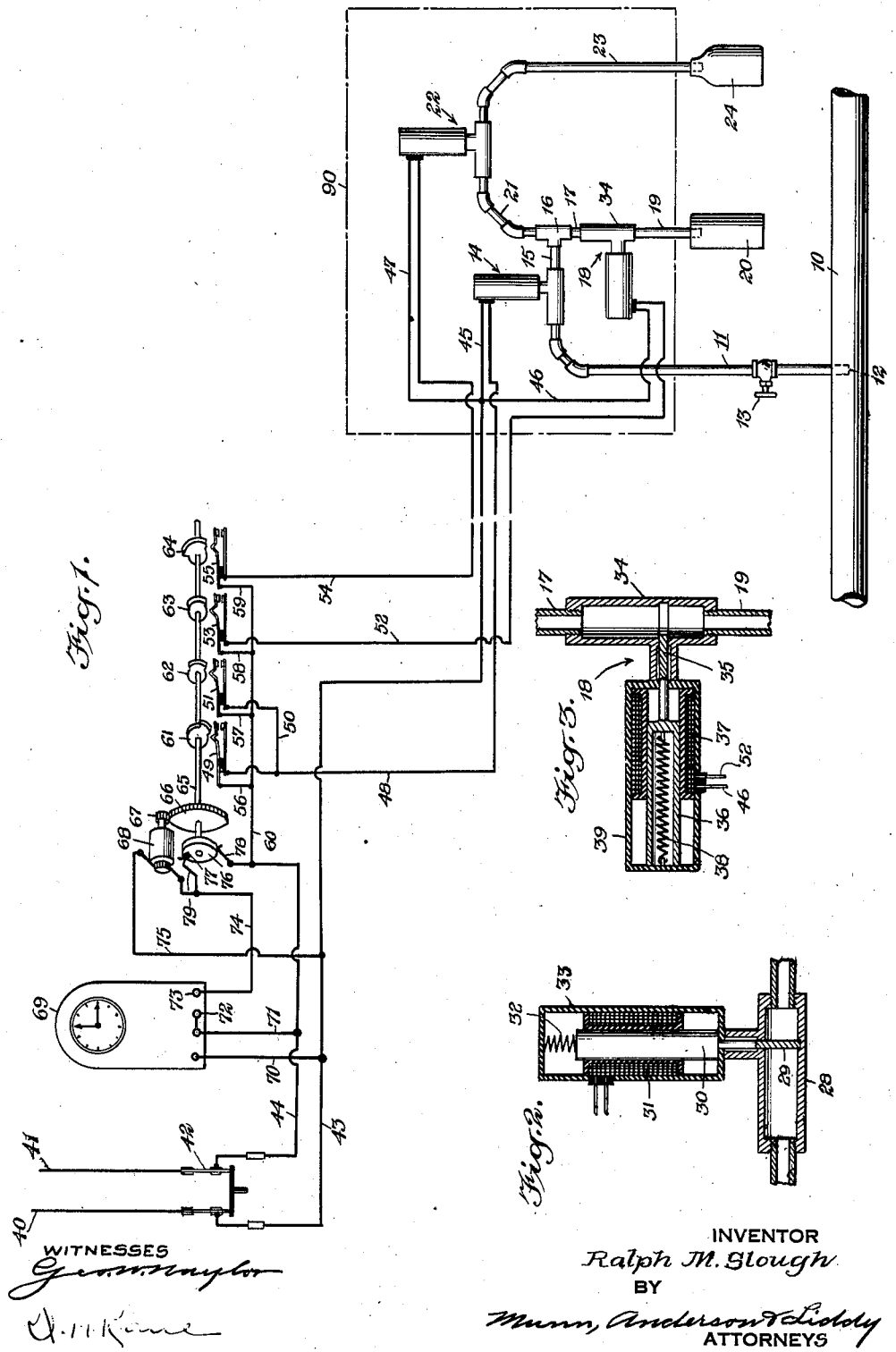
INVENTOR
Ralph M. Slough
BY
Munn, Anderson & Liddy
ATTORNEYS Dec. 12, 1939.  R. M. SLOUGH  2,183,338
LIQUID SAMPLING APPARATUS
Filed Jan. 19, 1939   3 Sheets-Sheet 2
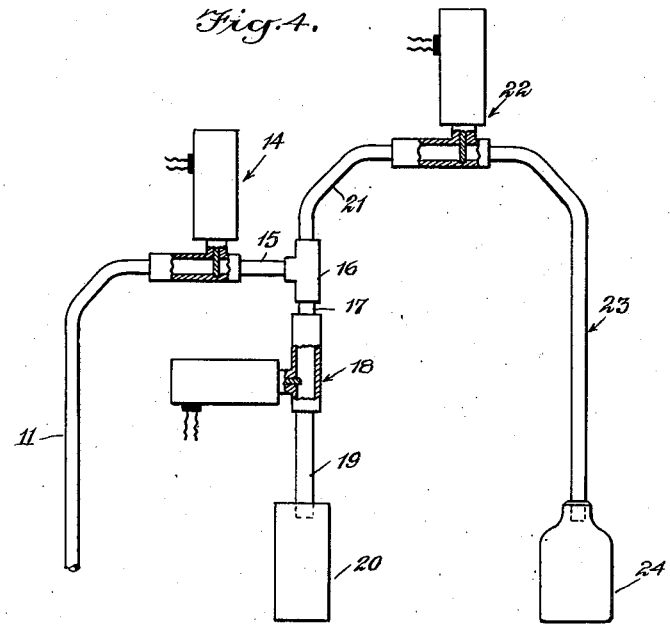
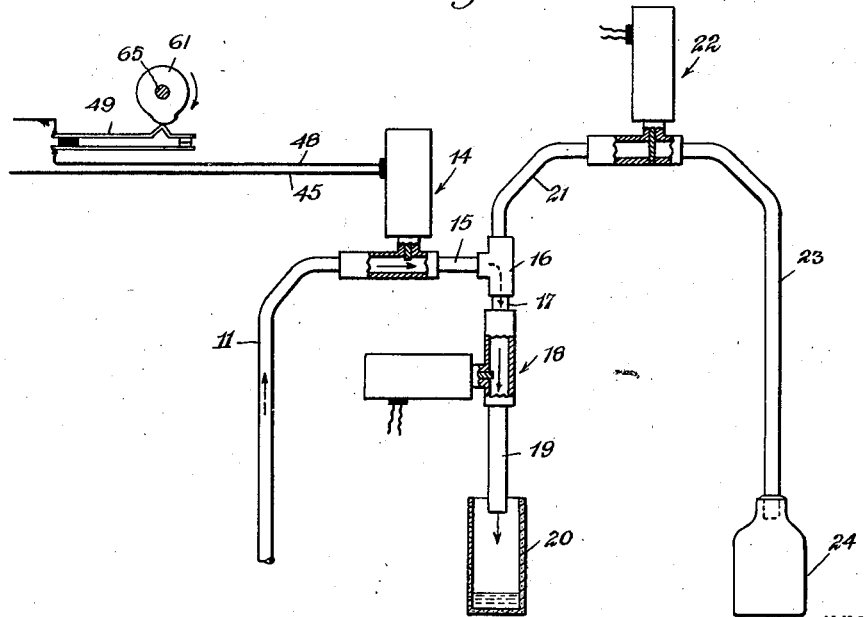
INVENTOR
Ralph M. Slough
BY
Munn, Anderson & Liddy
ATTORNEYS Dec. 12, 1939.                R. M. SLOUGH                2,183,338
                      LIQUID SAMPLING APPARATUS
                      Filed Jan. 19, 1939           3 Sheets—Sheet 3
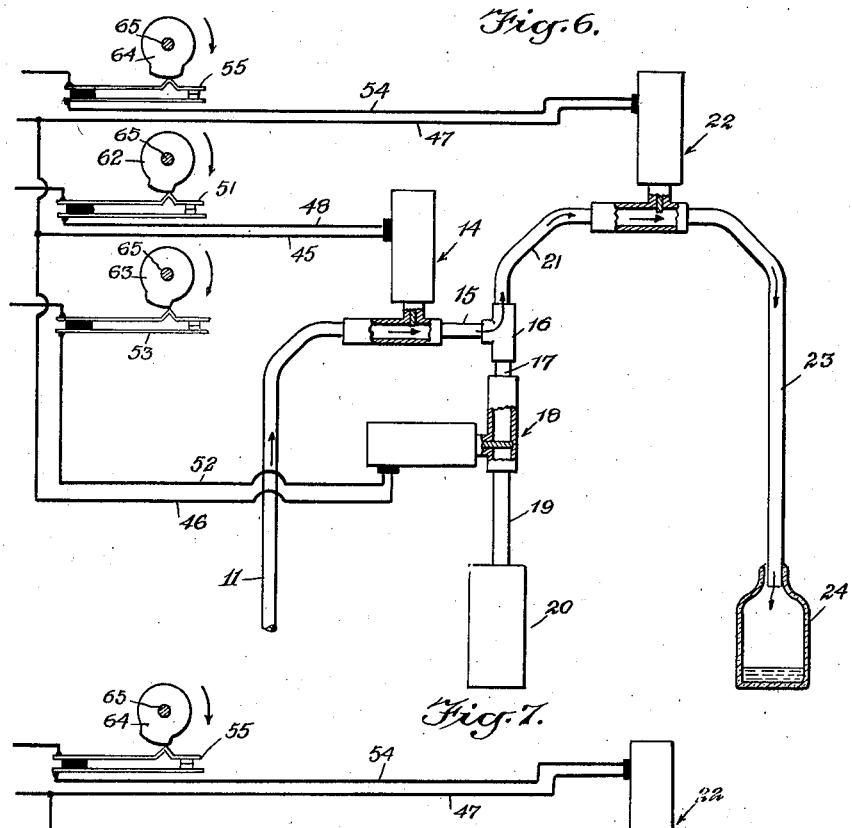
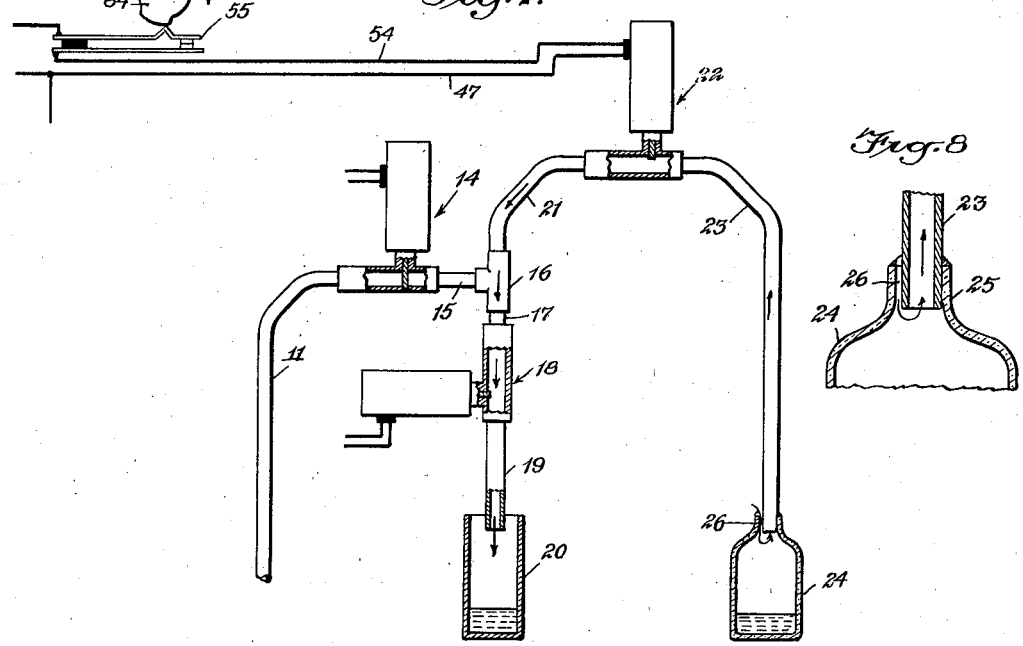
WITNESSES
INVENTOR
Ralph M. Slough
BY
Munn, Anderson & Liddy
ATTORNEYS Patented Dec. 12, 1939

2,183,338

UNITED STATES PATENT OFFICE 2,183,338

LIQUID SAMPLING APPARATUS

Ralph M. Slough, Findlay, Ohio, assignor to The Illinois Pipe Line Company, Findlay, Ohio, a corporation of Ohio Application January 19, 1939, Serial No. 251,709

1 Claim. (Cl. 73—21)

This invention relates to improvements in liquid sampling apparatus that may be used for automatically drawing samples of a liquid at predetermined intervals from industrial systems, pipe lines and the like.

In the transportation of crude oil and other liquid through pipe lines it is desirable to take samples at predetermined intervals for the purpose of determining the character, particularly the specific gravity, and the amount of impurities present in the liquid. Heretofore no satisfactory apparatus has been provided for taking true samples or specimens of the liquid from the pipe line at the desired time intervals.

It is a particular object of this invention to overcome the difficulties heretofore encountered and to provide improved apparatus which may be used for automatically withdrawing samples of the oil or other liquid passing through a pipe line at the desired time intervals.

It is a further object of the invention to provide apparatus of this character which will automatically eliminate stagnant liquid present in the apparatus so as to obtain an accurate specimen or sample of the liquid passing through the pipe line.

A further object of this invention is the provision of an improved apparatus of the above character which is positive and accurate in its operation, which is of relatively simple construction, having few moving parts, and which will operate over long periods of time with comparative freedom from wear.

In the accompanying drawings—

Figure 1 is a partially diagrammatic view of liquid sampling apparatus embodying my invention;

Fig. 2 is a detail sectional view of one type of valve employed in my apparatus;

Fig. 3 is a similar view of another type of valve employed in my apparatus;

Fig. 4 is a partially fragmentary diagrammatic view of a portion of the apparatus showing the normal arrangement of the valves;

Fig. 5 is a similar view showing the position of the valves during the first stage in the cycle of operation;

Fig. 6 is a similar view showing the arrangement of valves during the second stage in the cycle of operation;

Fig. 7 is a similar view of the apparatus during the third stage of the cycle of operation, and Fig. 8 is a detail view of the upper end of the sample container showing the connection between the container and the filling tube or duct.

As stated above, my apparatus is particularly suited for use in connection with pipe lines for the transportation of crude oil and other liquids, and in the accompanying drawings I have illustrated my apparatus as applied to such a pipe line.

Referring more particularly to Figure 1, the numeral 10 indicates a standard type of pipe line employed in the transportation of crude oil and other liquids. So as to withdraw sample specimens of the petroleum oil or other liquid passing through the pipe line at the desired time intervals, I provide a conduit 11 which projects through one side of the pipe line 10 so that the lower end 12 extends into the liquid passing through the pipe line. If desired, a manually controlled shut-off valve 13 may be provided in the conduit 11. The point at which the conduit 11 passes through the side of the pipe line 10 is preferably sealed so as to prevent the escape of liquid or loss of pressure at this point.

Since the pressure inside the pipe line is above atmospheric pressure and since the opposite end of conduit 11 is connected with containers at atmospheric pressure, the liquid in the pipe line will pass through the conduit into the containers when the control valves hereinafter described are opened.

The conduit 11 may be provided with the necessary elbows, joints and couplings as shown and finally communicates with a primary control valve 14 which under normal conditions is closed. The outlet end of valve 14 is connected by means of a conduit 15 to T-coupling 16 and one of the outlets of the T-coupling is connected by conduit 17 to valve 18 which is normally open. The outlet side of valve 18 is connected to conduit 19 which in turn communicates with the discard container 20.

Referring again to T-coupling 16, the other outlet thereof is connected by means of conduit 21 having the necessary couplings and elbows, to a third valve 22 which is normally closed and is similar in construction to valve 14. The outlet side of valve 22 is connected to conduit 23 which communicates at its opposite end with the sample container 24. Both the discard container and the sample container communicate with the atmosphere and in this way it will be appreciated that the contents thereof are at atmospheric pressure.

I have found that it is desirable to have a minimum of contact between the air and the liquid in the sample container, and for this reason I provide the upper end of the sample container with a tubular neck 25 into which the conduit 23 extends. The tubular neck is preferably soldered to the conduit 23 and is provided with a relatively small channel or duct 26 communicating at its upper end with the atmosphere and at its lower end with the inside of the container.

When the apparatus is in use the manually controlled valve 13 is in open position. Normally the valves 14 and 22 are closed and valve 18 is open. Periodically the cycle of operation of the valves occurs so as to cause a sample specimen of the oil or other liquid passing through pipe line 10 to flow into sample container 24. When the apparatus is used for drawing test samples of petroleum from a petroleum pipe line I have found it desirable to draw a specimen of about half a pint every hour.

The cycle of operation is as follows:

Valve 14 is first caused to open for a sufficient length of time to permit the stagnant oil in conduits 11 and 15 to flow through conduit 17, valve 18 and conduit 19, into discard container 20. Valve 18 is then caused to close and simultaneously valve 22 is caused to open, with the result that the oil flows through conduit 21, valve 22 and conduit 23 into sample container 24.

When the desired amount of oil has flowed into the sample container the third stage of the cycle of operation occurs and valve 14 closes and simultaneously valve 18 opens. Valve 22 remains open for a sufficient period of time to permit the oil to drain out of the valve and out of conduits 21 and 23. Thereafter valve 22 closes and all of the valves are then in their normal position.

The cycle of operation just described occurs at the desired intervals which in the case of petroleum oil, as stated above, is preferably every hour. To cause the cycle of operation just described the valves 14, 18 and 22 are preferably magnetically operated and are controlled by suitable timing mechanism.

Valves 14 and 22 are of similar construction and this construction is clearly shown in Fig. 2. Thus each of these valves comprises a tubular portion 28 having an inlet and an outlet at its respective ends. A valve body 29 is formed on the end of armature 30 which is controlled by solenoid 31. Normally the valve is held in closed position extending across the tubular portion 28 by means of a compression spring 32 extending between the top casing 33 and the end of armature 30. When the winding of solenoid 31 is energized, armature 30 is shifted upwardly against the tension of spring 32, causing the valve to open.

Valve 18 is shown in Fig. 3 and comprises a tubular portion 34 having an inlet and an outlet at its respective ends and provided with a valve body 35 formed at the end of armature 36, which in turn is controlled by solenoid 37. The valve 35 is normally held in open position by means of tension springs 38 connected between the top of casing 39 and the lower end of the armature 36, which is tubular as shown. When the winding of solenoid 37 is energized armature 36 is caused to shift to the right against the tension of spring 38 as viewed in Fig. 3, thereby shifting the valve body 35 across the tubular portion 34 and closing the passage.

The solenoids of the several valves are connected in a suitable electric circuit having switches operated by time-controlled mechanism, so as to cause the cyclical operation of the valves at the desired time intervals in the manner described above. It will be appreciated that different types of time-controlled mechanism may be employed and that I have merely shown one satisfactory illustrative type of timing mechanism.

The wiring circuit comprises two leads 40 and 41 leading from a suitable source of electric current and connected to the double pole switch 42. The opposite terminals of the switch 42 are connected in turn to leads 43 and 44. One end of the solenoid winding of each of the valves 14, 18 and 22 is connected by leads 45, 46 and 47 respectively to the lead 43. The opposite end of the solenoid winding for valve 14 is connected by lead 48 to a cam-operated switch 49 and by leads 48 and 50 to a cam-operated switch 51. The opposite end of the winding of the solenoid for valve 18 is connected by lead 52 to cam-operated switch 53 and the opposite end of solenoid winding for valve 22 is connected by lead 54 to cam-operated switch 55. Switches 49, 51, 53 and 55 are connected by leads 56, 57, 58 and 59 to lead 60 which in turn is connected to lead 44. It will thus be seen that when either switch 49 or 51 is closed the solenoid circuit for valve 14 is closed, with the result that the valve opens. Likewise, when switch 53 is operated the solenoid circuit of valve 18 is completed, with the result that the valve closes, and when switch 55 is operated the solenoid circuit of valve 22 is completed, causing the valve to open.

The cyclical operation of the several switches 49, 51, 53 and 55 is caused by cams 61, 62, 63 and 64 mounted on shaft 65 and each of which is provided with a dwell portion adapted to engage and close its respective switch at the desired time. The cams are adapted to rotate in a clockwise direction and it will be seen that the dwell portion of cam 61 engages its switch 49 prior to the engagement of the dwell portions of the remaining cams. The dwell portions of each of the cams 62, 63 and 64 engage their respective switches simultaneously, but it will be seen that the dwell portion of cam 64 is slightly longer than the remaining dwell portions, with the result that it continues to engage switch 55 after the other dwell portions have ceased to engage their respective switches. Thus it will be seen that upon the rotation of shaft 65 the valves 14, 18 and 22 are caused to operate cyclically in the manner described above.

To cause the operation of the shaft I provide a gear 66 mounted on the shaft and engaging a pinion 67 mounted on the armature of electric motor 68. When motor 68 is operated it accordingly causes the rotation of shaft 65 and the cyclical operation of the valves.

I have already pointed out that it is desirable to cause the cyclical operation of the valves at predetermined time intervals. To accomplish this result I provide a timeclock 69 of standard construction. The clock may be electrically operated, being connected by leads 70 and 71 to the leads 43 and 44. It will be seen that lead 71 is also connected to a terminal 72 on the clock. At predetermined intervals, which are subject to variation and adjustment, the circuit between terminal 72 and another terminal, 73, is closed. It will be seen that terminal 73 is connected by a lead 74 to motor 68 which is also connected by lead 75 to lead 43. Thus, at predetermined intervals when the timeclock operates, the circuit of motor 68 is completed through leads 43 and 75 and through lead 74, terminal 73, terminal 72, and leads 71 and 44.

It will be appreciated however, that the timeclock 69 only causes a momentary closing of the circuit and accordingly I also provide means for locking in the circuit for a complete cycle of operation. This means comprises a disk 76 mounted on the end of shaft 65. The disk is formed of conducting material but is provided with an insulated spot 77 as shown. A brush or contact member 78 wipes the periphery of disk 76 and is connected to lead 44. Another brush or contact 79 wipes the face of the disk in the normal path of movement of the spot 77 and is connected to lead 74. When the mechanism is in a position of rest the brush 79 contacts the insulated spot 77. When the timeclock 79 closes the circuit to motor 68 the motor will operate, causing the rotation of gear 66, shaft 65 and disk 76, with the result that brush 79 no longer engages spot 77 but will rest on the face of the disk. The circuit will then be completed to the motor through lead 74, brush 79, disk 76, brush 78 and lead 44. It will be appreciated that the circuit will remain closed until brush 79 once again engages the insulated spot 77, at which time the circuit opens, causing the motor to cease operating.

When my device is used for obtaining test samples of petroleum oil from a pipe line it operates as follows:

Manually operated valve 13 is opened and switch 42 is closed. Timeclock 69 is adjusted so as to cause the periodical closing of the circuit to motor 68 at the desired time intervals, preferably every hour. Cams 61 to 64 are also adjusted and arranged so as to cause the cyclical operation of the valves as hereinafter described and so as to cause the desired quantity of sample to be drawn into the sample container during each cycle of operation and so as to also cause complete drainage of the stagnant oil into discard container 20. During the period between the cyclical operation of the valves their normal position is as indicated in Fig. 4 with valves 14 and 22 in closed position and valve 18 in open position.

When the timeclock 69 closes the circuit to motor 68, shaft 65 is rotated and the first result is that the dwell portion of cam 61 engages and closes switch 49. This completes the solenoid circuit of valve 14, opening the valve as shown in Fig. 5. During this period the oil in conduit 11 and valve 14 is caused to flow downwardly through conduit 17 to the valve 18, and conduit 19 into discard container 20. Thereafter the second stage in the cycle of operation occurs in which cams 62, 63 and 64 engage their respective switches, causing valve 14 to remain open, causing valve 18 to close, and causing valve 22 to open, as shown in Fig. 6. During this stage of operation the oil is caused to flow through conduit 21, valve 22 and conduit 23, into the sample container. Thereafter the third stage in the cycle of operation occurs, which is illustrated in Fig. 7. During this stage of operation all of the cams have released their engagement with their respective switches, with the exception of cam 64 which continues to engage its switch and to hold valve 22 in open position for a sufficient period of time for all of the oil to drain out of the valve and out of conduits 21 and 23. Upon further rotation of shaft 65, cam 64 releases engagement with switch 55 and the valves all resume their normal position as shown in Fig. 4. At this stage in the operation brush 79 rests upon insulated spot 77 with the result that operation of the motor ceases. The cycle of operation as described above is repeated at the desired time intervals upon the operation of timeclock 69.

It will be seen that I have provided improved sampling apparatus for withdrawing the desired quantity of a liquid from a pipe line or from an industrial system at the desired time intervals, and that the sample thus withdrawn is a true specimen of the liquid flowing through the pipe line at that time. It will also be seen that the apparatus is of comparatively simple construction and that it is positive in its operation. It should be understood that at desired time intervals such as once a day, the sample container 24 may be emptied and the liquid therein tested.

Petroleum pipe lines are usually of uniform pressure and accordingly, when my apparatus is used in connection with a petroleum pipe line a measured amount of liquid will flow into the sample container during a predetermined time interval. Where my apparatus is used in connection with a system that does not have a uniform pressure a pressure-regulating valve may be inserted in conduit 11.

It will be appreciated that by varying the arrangement and adjustment of the cams different quantities of liquid can be withdrawn, and that by varying the adjustment of the timeclock the samples can be withdrawn at different time intervals.

It should be understood that modifications may be made in the illustrated and described embodiments of my invention, such as varying the type of time-controlled mechanism and valves employed.

I claim:

A sampling apparatus for liquids comprising a conduit adapted to receive the liquid to be sampled, a primary control valve for the conduit, a discard conduit leading from the first-mentioned conduit beyond the primary control valve and adapted to withdraw from the system and discard stagnant liquid present in the conduits, a second valve for controlling the discard conduit, a sampling conduit connected to the first-mentioned conduit beyond the primary valve and adapted to receive and withdraw from the system the liquid to be sampled, a third valve for controlling the sampling conduit, and means for causing the sequential operation of the valves so as to first withdraw through the discard conduit the stagnant liquid in the system, then withdraw a true sample of the liquid through the sampling conduit, and finally drain the liquid from the sampling conduit.

RALPH M. SLOUGH.